US005320885A

United States Patent [19]

Yamane et al.

[11] Patent Number: 5,320,885
[45] Date of Patent: Jun. 14, 1994

[54] IMAGE-RETRANSFER SHEET FOR DRY-PROCESSING TYPE IMAGE-TRANSFERRING MATERIAL

[75] Inventors: Mitsuo Yamane, Yokkaichi; Takashi Kawaguchi, Aichi, both of Japan

[73] Assignee: Brother Kogyo Kabushiki Kaisha, Aichi, Japan

[21] Appl. No.: 842,503

[22] Filed: Feb. 27, 1992

[30] Foreign Application Priority Data

Mar. 1, 1991 [JP] Japan .................................. 3-036136
Mar. 4, 1991 [JP] Japan .................................. 3-037189

[51] Int. Cl.[5] ............................................. B32B 9/00
[52] U.S. Cl. .................................... 428/195; 428/206; 428/207; 428/327; 428/337; 428/339; 428/343; 428/500; 428/914; 156/235
[58] Field of Search ............... 428/195, 327, 447, 327, 428/481, 488.1, 206, 207, 337, 339, 500, 343, 914; 156/235

[56] References Cited

U.S. PATENT DOCUMENTS 4,778,729 10/1988 Mizobuchi .......................... 428/484
4,973,509 11/1990 Yamane .

FOREIGN PATENT DOCUMENTS 63-128987 6/1988 Japan .
63-246298 10/1988 Japan .
2-81684 3/1990 Japan .
2-88294 3/1990 Japan .

*Primary Examiner*—Patrick J. Ryan
*Assistant Examiner*—William A. Krynski
*Attorney, Agent, or Firm*—Oliff & Berridge

[57] ABSTRACT

An image-retransfer sheet for receiving an image and for retransferring the received image onto a desired image-receiving material. The image-retransfer sheet includes a substrate and a surface layer formed of surface treating agent and coated on one surface of the substrate for defining an image-receiving surface. The surface layer is provided with adhesive force control matter for controlling adhesive force to be imparted from the image-receiving surface of the surface layer. The adhesive force control matter may be provided on the surface layer in the form of a layer coated on the surface layer. Or otherwise, the adhesive force control matter may include polyethylene fine powders mixed with the surface treating agent in the surface layer. The adhesive force control matter thus provided in the image-retransfer sheet serves to control the adhesive force to such a value that only a part of the surface layer receiving the image thereon may be retransferred onto the image-receiving material together with the image.

19 Claims, 2 Drawing Sheets

IMAGE-RETRANSFER SHEET FOR DRY-PROCESSING TYPE IMAGE-TRANSFERRING MATERIAL

BACKGROUND OF THE INVENTION

The present invention relates to an image-retransfer sheet to which an image such as letters, symbols, figures, etc. is thermally printed or transferred and from which the image is retransferred onto a surface of an image-receiving material with pressure. More specifically, the present invention relates to an image-retransfer sheet which is a base sheet for an image-transferring material.

Hitherto, instant lettering has been performed with using the image-transferring material, as follows:

An image such as letters, figures, symbols, etc. is thermally printed or transferred onto a surface of an image-retransfer sheet with using a heat sensitive image transferring device such as a printer, a typewriter, a word processor or the like, so that an image-transferring material having printed thereon the image is produced. In other words, the image is printed or transferred onto the image-retransfer sheet through a heat-sensitive image transfer process, so that the image-transferring material having printed thereon the image is produced. Thus obtained image-transferring material is then placed on a desired image-receiving material in such a manner that the image-bearing surface of the image-transferring material is brought into contact with a surface of the image-receiving material. In this state, the image-transferring material is pressed toward the image-receiving material under dry condition, as a result of which the image on the image-transferring material is transferred onto the surface of the image-receiving material. In other words, the image on the image-transferring material is retransferred onto the image-receiving material through a pressure-sensitive image retransfer process. Such an image-transferring material as capable of attaining the pressure-sensitive image retransfer function under dry condition will be referred to as "dry-processing type image-transferring material", hereinafter.

Japanese Unexamined Patent Application Publication No. sho-63-128987 discloses such an image-retransfer sheet onto which an image is to be transferred through the heat-sensitive transfer process to produce the dry-processing type image-transferring material. The image-retransfer sheet consists of a substrate film (such as a film of polyethylene, polypropylene, fluorine-containing resin, etc.) which has a smooth surface and exhibits a water-contact angle of at least 95° or consists of a substrate sheet (such as a paper, metal foil, plastic film, etc.) coated with a silicone resin layer for treating the surface of the substrate sheet so that the substrate sheet may have a smooth surface and exhibit a water-contact angle of at least 95°.

In order to form or transfer an ink image onto such an image-retransfer sheet as having a water-contact angle of 95° or more (particularly 105° or more) through the heat-sensitive image transfer process, it is necessary to reduce surface tension of ink to wet the surface of the image-retransfer sheet and further necessary to increase adhesion of the image-retransfer sheet to the ink more than both cohesive force of the ink and adhesion between the ink and a polyethylene terephthalate (PET) sheet. For the purpose, the ink temperature has to be increased when the image is thermally printed, requiring high energy to be applied to the heat-sensitive image-transferring device, which is disadvantageous in view of durability of a thermal head and load on a power supply.

Since the conventional image-retransfer sheet has poor wettability, an image thermally printed on the image-retransfer sheet is liable to be retransferred with slight pressure applied thereto, due to weak adhesion of the image to the image-retransfer sheet. Accordingly, a portion of the image which is undesired to be retransferred from the image-retransfer sheet may unwillingly be retransferred, causing stains on the image-receiving material. Such easy retransfer is troublesome in handling of the sheet. In other words, the conventional image-retransfer sheet has a low rubbing-resistant property.

Furthermore, since the conventional image-retransfer sheet has an extremely small static friction coefficient, the sheet is liable to be moved with respect to the image-receiving material during the pressure-sensitive image retransfer process, so that the image is retransferred onto an undesired portion of the image-receiving material and the image retransferred onto the image-receiving material is distorted.

Japanese Unexamined Patent Application Publication No. sho-63-246298 discloses an image-retransfer sheet formed with a sticky layer at a position apart from the printed image for preventing the sheet from moving during the pressure-sensitive image retransfer operation. However, the formation of a sticky layer on a certain portion of the image-retransfer sheet necessitates specific means in production and an exclusive device therefor, requiring large costs. Furthermore, the sticky layer has to be covered with a separable sheet before use, i.e., before the image-retransfer step, which requires additional means and costs. In the case where the image-retransfer sheet has a repelable-type coating layer of silicone resin, in order to produce the image-retransfer sheet, it is necessary to coat a substrate of the image-retransfer sheet twice with the repelable coating layer and the sticky layer. In this case, regardless of coating order of the two, the later coating operation may be affected by the previous coating operation. That is, when a silicone resin is first coated on the substrate, the subsequent coating of a sticky composition is liable to be repeled. When the sticky composition is first coated, on the other hand, it is difficult to coat the silicone resin on the sticky layer because of stickiness of the previously coated sticky layer. In this case, if the sticky layer is covered with a separable sheet, the thickness of the resulting sheet partially increases so that the silicone resin cannot easily be coated. Contrary to the above description, even if the sticky layer is properly coated on the sheet, since the sticky layer is provided only at a certain portion of the sheet, the image-retransfer sheet is not fixed with respect to the image-receiving material at all the portions surrounding the image, and therefore the sheet is still liable to move during the image-retransfer step, resulting in formation of imperfect images on the image-receiving material.

In any case, a conventionally employed surface treating agent layer such as the silicone resin layer coated on the substrate of the image-retransfer sheet serves to ensure improved releasability of the ink image from the substrate. Therefore, the surface treating agent has been selected or formulated to have the property of reducing wettability of the substrate and decreasing adhesion of the ink image thereto, which property, however, deteriorates the heat-sensitive image-transferring property but necessitates a high thermal energy for the heat-sensitive transfer and deteriorates the image-rubbing resistance of the image-retransfer sheet.

In order to eliminate the above-described defects, Japanese Unexamined Patent Application Publications Nos.hei-2-81684 and hei-2-88294 have proposed that the surface treating agent provided on the image-retransfer sheet be retransferred toward the image-receiving material together with the image. The surface treating agent employed in the publications has a tensile strength in a range of 1 to 100 $Kg/cm^2$. The surface treating agent has a melting point or softening point equal to or higher than 100 ° C. or has a melt viscosity at 100° C. of equal to or higher than 1000 poises.

When the image-retransfer sheet coated with the above-described surface treating agent layer is subjected to the pressure-sensitive image retransfer process, however, not only a part of the surface treating agent layer provided below a position where the ink image is printed but also another part of the surface treating agent layer surrounding the ink image is liable to be retransferred onto the image-receiving material together with the ink image. Accordingly, in the case where the surface treating agent contains a colorant, there may occur a problem that a thickness of a line image retransferred onto the image-receiving material becomes extremely large or that an image retransferred on the image-receiving material is completely damaged to be hardly recognized.

SUMMARY OF THE INVENTION

The first object of the present invention is, therefore, to provide an image-retransfer sheet which is capable of retransferring only the part of the surface treating agent layer provided exactly below the printed ink image onto the image-receiving material together with the ink image but which is capable of preventing another part of the surface treating agent surrounding the ink image from being retransferred.

The second object of the present invention is to provide an image-retransfer sheet which can be easily prevented from being moved with respect to the image-receiving material during the pressure-sensitive image retransfer operation.

The third object of the present invention is to provide an image-retransfer sheet capable of retaining an ink image thereon even when rubbed slightly or applied low pressure thereto. In other words, the third object of the invention is to provide an image-retransfer sheet having high image rubbing-resistant property.

The fourth object of the present invention is to provide an image-retransfer sheet capable of receiving an ink image of good quality through the heat-sensitive image transfer process with applied low energy.

The fifth object of the present invention is to provide an image-retransfer sheet capable of completely retransferring an ink image which has been thermally transferred thereto onto an image-receiving material with no residual ink remained on the image-retransfer sheet.

The sixth object of the present invention is to provide an image-retransfer sheet which makes it easy to confirm whether or not the ink image on the sheet has been retransferred to the image-receiving material.

The seventh object of the present invention is to provide an image-retransfer sheet capable of retransferring the ink image onto an image-receiving material so that the ink image thus retransferred onto the image-receiving material has an improved rubbing resistant property.

These objects of the present invention has been attained by providing an image-retransfer sheet for receiving an image and for retransferring the received image onto a desired image-receiving material, the image-retransfer sheet including: a substrate; and a surface layer formed of surface treating agent coated on one surface of said substrate, the surface layer defining an image-receiving surface onto which an image is to be transferred and from which the transferred image is to be retransferred onto a desired image-receiving material, the surface layer being provided with an adhesive force control matter for controlling an adhesive force to be imparted from the image-receiving surface.

The adhesive force control matter may be provided on the surface layer in the form of a layer coated thereon, the layer of the adhesive force control matter defining the image-receiving surface onto which the image is to be transferred and from which the transferred image is to be retransferred onto the desired image-receiving material. In this case, the layer of the adhesive force control matter preferably has a static friction coefficient equal to or larger than 0.25 and preferably has a water-contact angle in a range of 80° to 120°. The adhesive force control matter preferably includes first and second material, an amount of the second material relative to that of the first material being adjusted to control the adhesive force to be imparted from the image-receiving surface of the layer of the adhesive force control matter.

Or otherwise, the adhesive force control matter may be provided in the surface layer in the form of polyethylene fine powders mixed with the surface treating agent of the surface layer, an amount of the polyethylene fine powders relative to that of the surface treating agent being adjusted to control the adhesive force to be imparted from the image-receiving surface.

The surface layer preferably has a tensile strength in a range of 1 to 100 $Kg/cm^2$. At least one of melting point and softening point of the surface layer is equal to or higher than 100° C., or the surface layer has a melt viscosity at 100° C. equal to or higher than 1000 poises. The surface layer preferably includes dispersion of the surface treating agent.

The adhesive force control matter thus provided in the image-retransfer sheet serves to control a value of the adhesive force to be imparted from the image-receiving surface to such a value that only a part of the surface layer receiving the image thereon may be retransferred onto the image-receiving material together with the image.

According to another aspect of the present invention, an image-retransfer sheet for receiving an image and for retransferring the received image onto a desired image-receiving material, includes: a substrate; a surface treating layer formed of surface treating agent and coated on one surface of said substrate; and an adhesive force control layer coated on the surface treating layer for receiving thereon an image to be retransferred therefrom onto a desired image-receiving material, the adhesive force control layer containing base material and adhesive force controlling material, an amount of the adhesive force controlling material relative to that of the base material being adjusted to control an adhesive force of said adhesive force control layer. The surface treating layer preferably has a tensile strength in a range of 1 to 100 Kg/cm$^2$. At least one of melting point and softening point of said surface treating layer is preferably equal to or higher than 100° C., or otherwise the surface treating layer preferably has a melt viscosity at 100° C. equal to or higher than 1000 poises. The surface treating layer preferably includes dispersion of the surface treating agent. The adhesive force control layer preferably has a static friction coefficient equal to or larger than 0.25 and a water-contact angle in a range of 80° to 120°.

According to still another aspect of the present invention, an image-retransfer sheet for receiving an image and for retransferring the received image onto a desired image-receiving material, includes: a substrate; and a surface treating layer coated on one surface of said substrate for receiving thereon an image to be retransferred onto a desired image-receiving material, the surface treating layer including surface treating agent and polyethylene fine powders, an amount of the polyethylene fine powders relative to the amount of the surface treating agent being adjusted to control an adhesive force of the surface treating layer. The surface treating layer preferably has a tensile strength in a range of 1 to 100 Kg/cm$^2$. At least one of melting point and softening point of the surface treating layer is equal to or higher than 100° C., or otherwise, the surface treating layer preferably has a melt viscosity at 100° C. equal to or higher than 1000 poises. The surface treating layer preferably includes dispersion of the surface treating agent.

Other objects, features and advantages of the present invention will become apparent in the following specification and accompanying drawings.

BRIEF DESCRIPTION OF THE DRAWINGS

Throughout the accompanying drawings, the same reference numerals or characters are used to refer to the same or like parts.

DETAILED DESCRIPTION OF THE PREFERRED EMBODIMENTS

An image-retransfer sheet of the first preferred embodiment of the present invention will be described below, with reference to FIGS. 1 and 2.

Figure 1:
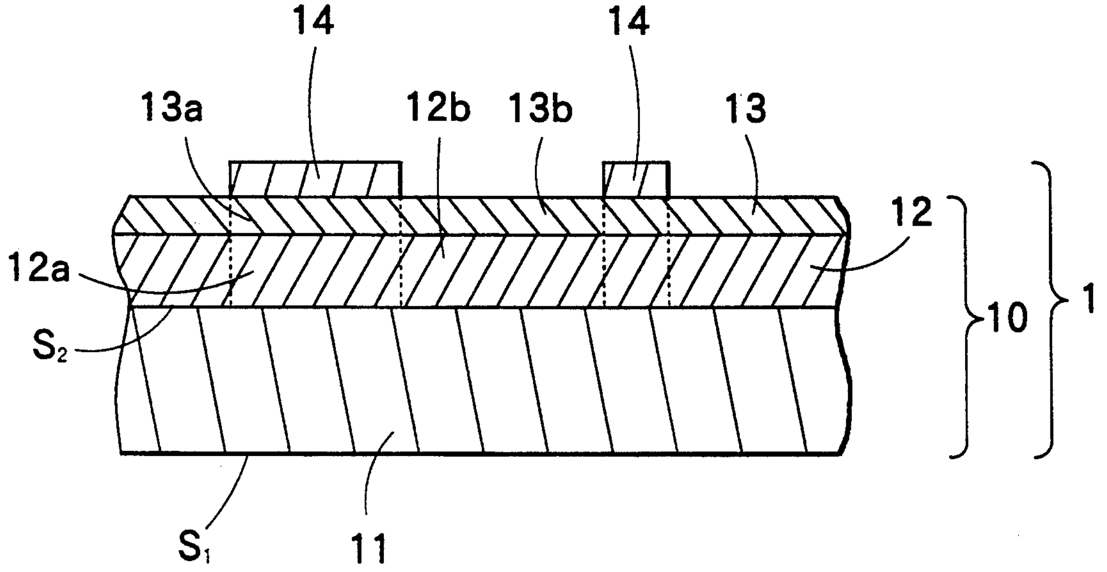
FIG. 1 illustrates a sectional view of an image-retransfer sheet of the first embodiment of the present invention.

As shown in FIG. 1, the image-retransfer sheet 10 of the present embodiment includes a substrate 11 having opposite surfaces S1 and S2. A surface treating agent layer 12 is formed on one surface S2 of the substrate 11. A pressure-sensitive adhesive force control layer 13 is further formed on the surface treating agent layer 12.

The image-retransfer sheet 10 having the above-described structure is adapted to be subjected to a heat-sensitive transfer process with a heat-sensitive transfer device such as a printer, typewriter, word processor, etc., as a result of which a dry processing type image-transferring material 1 is produced. Therefore, the image-transferring material 1 includes the substrate 11, the surface treating agent layer 12 and the pressure-sensitive adhesive force control layer 13, on a surface of which an ink image 14 has been thermally printed.

Figure 2:
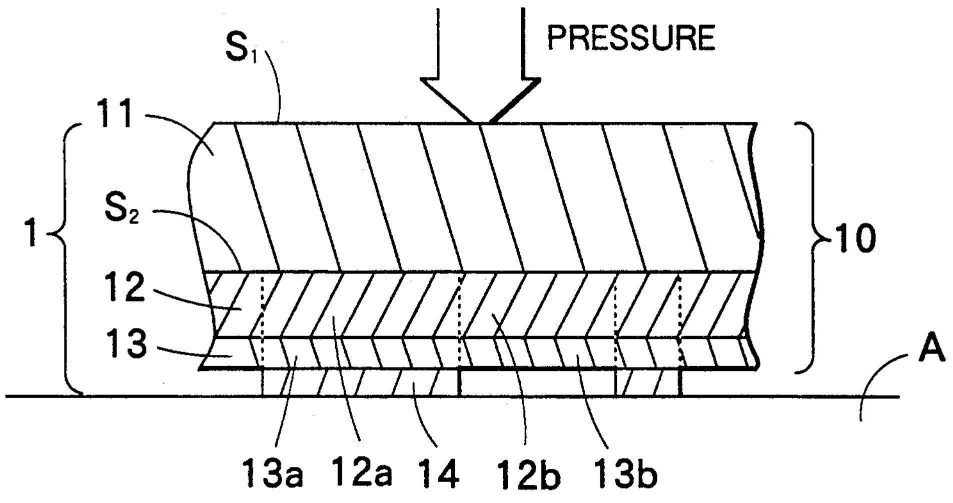
FIG. 2 illustrates the manner how the image-transferring material produced from the image-retransfer sheet is subjected to the pressure-sensitive image retransfer operation.

Thus produced image-transferring material 1 is adapted to be subjected to a pressure-sensitive retransfer process, as shown in FIG. 2. More specifically, the image-transferring material 1 is placed on a desired image-receiving material A such that the adhesive force control layer 13 with the ink image 14 formed thereon is brought into contact with a surface of the image-receiving material A. In such a state, a pressure is applied onto the surface S1 of the substrate 11 of the image-transferring material 1 in a direction indicated by an arrow in FIG. 2 so that the image-transferring material 1 be pressed toward the image-receiving material A. As a result, the ink image 14 and the parts **12*a* and 13*a* of the surface treating agent layer 12 and the pressure-sensitive adhesive force control layer 13 positioned exactly below the ink image 14 are retransferred onto the surface of the image-receiving material A. However, other parts 12*b* and 13*b* of the layers 12 and 13 which are not positioned below the ink image 14** are prevented from being retransferred to the image receiving material.

The substrate 11 which can be employed in the image-retransfer sheet 10 of the present embodiment generally has a thickness in a range of 25 to 200 micrometers and preferably in a range of 50 to 150 micrometers. It is preferred that the substrate 11 not only has a mechanical strength sufficient to be handled in production of the image-retransfer sheet 10 but also has flexibility to such an extent that the image-retransfer sheet 10 can be easily subjected to the heat-sensitive transfer process to produce the image-transferring material 1 and that pressure can easily act upon an ink image 14 through the substrate 11 during the pressure-sensitive retransfer process. However, a substrate material exhibiting too large elongation is not preferred, since the substrate formed of such the substrate material is stretched too much at the time when pressure is applied to the image-transferring material 1 for retransfer of the ink image 14, causing distortion of the image retransferred onto the image-receiving material. The substrate 11, therefore, preferably has elongation of not more than 200%.

To ensure the retransfer of the ink image 14 precisely onto the image-receiving material A with pressure, the substrate 11 is preferably transparent or semi-transparent, and semi-transparent substrates are particularly preferred, since it is easy to check whether or not the ink image 14 is completely retransferred from the image-retransfer sheet 10.

Examples of the substrate 11 having the above-described properties generally include plastic films, papers, metal foils and the like. Examples of the plastic films include films of ethylene, polypropylene, fluorine-containing resins (such as ethylene-tetrafluoroethylene copolymer and tetrafluoroethylene-hexafluoroethylene copolymer), polyethylene terephthalate, nylon, polyimide, polyvinyl chloride, polycarbonate, polysulfone, ethylene-vinyl acetate copolymer, acrylonitrile-butadiene-styrene copolymer, ionomers or the like.

The surface treating agent layer 12 which is coated on the one surface S2 of the substrate 11 has a tensile strength in a range of 1 to 100 Kg/cm$^2$ so that the surface treating agent 12 can be retransferred together with an ink image 14 formed on the surface treating agent onto the image-receiving material. More specifically to say, if the tensile strength exceeds 100 $Kg/cm^2$, the resulting surface treating agent layer 12 exhibits too high cohesive force to be retransferred. If it is less than 1 $Kg/cm^2$, the layer strength is so small that the resulting layer is apt to be peeled off when the sheet is simply bent.

The surface treating agent preferably has a melting point or softening point of 100° C. or more or has a melt viscosity at 100° C. of 1000 poises or more. If surface treating agent having a melting point of less than 100° C. is used as the surface treating agent layer 12, the layer 12 will be melted at the time when the image-retransfer sheet 10 is subjected to the heat-sensitive transfer process. As a result, the adhesion force between the substrate 11 and the layer 12 increases, causing failure in retransfer of the image 14.

The surface treating agent layer 12 preferably has a thickness in a range of 0.1 to 5 micrometers.

Examples of the surface treating agent 12 used in the present embodiment include resins (such as polyethylene, ethylene-vinyl acetate copolymer, vinyl chloride-vinyl acetate copolymer, polyvinyl butyral, celluloses, ethyleneethyl acrylate copolymer, ethylene-acrylic acid copolymer, ionomers, ethylene-methacrylic acid copolymer, polyvinyl alcohol, polyvinyl pyrrolidone, and the like) and waxes (such as polyethylene wax, montan wax, Fischer-Tropsch wax, synthetic wax and the like). They may be used independently or as a mixture of two or more. The use of wax makes it possible to finely control the tensile strength of the surface treating agent layer 12 and expand a range of choice of materials for the surface treating agents, to thereby improve the retransferring property of the image-retransfer sheet 10.

The surface treating agent 12 may further contain a colorant such as pigments and dyes. The layer 12 containing the colorant will provide the same effect as if an ink layer 14 formed thereon became thick. In other words, even if the ink image 14 per se has a low hiding power, the surface treating agent layer 12 retransferred together with the ink image 14 onto the image-receiving material A cooperate with each other to exhibit an increase hiding power to make the image 14 more legible.

In the case where the surface treating agent mainly includes the aforesaid resins, the surface treating agent is preferably coated on the substrate 11 in the form of dispersion such as emulsions and suspension. This is because the tensile strength of the surface treating agent layer 12 will be unwillingly extremely increased, if the surface treating agent is dissolved in a solvent or melted before being coated on the substrate in the form of solution or hot melt. In order to control the tensile strength or the adhesive force of the surface treating agent layer 12, a filler may be added to the layer 12.

With using the above-described surface treating agent materials for the layer 12, it becomes possible to retransfer not only the ink image 14 but also the surface treating agent 12 onto the image-receiving material A. Accordingly, the ink image 14 can be completely retransferred onto the image-receiving material A without any residual ink being remained on the image-transferring material 1. It becomes easy to confirm completion of retransfer. Furthermore, since the surface treating agent retransferred together with the ink image 14 will serve as a protective layer for the ink image 14 on the image-receiving material A, the image retransferred onto the image-receiving material has a high rubbing resistant property.

The pressure-sensitive adhesive force control layer 13 formed on the surface treating agent layer 12 is adapted to allow only the parts 12*a* of the layer 12 positioned exactly below the ink image 14 to be retransferred onto the image-receiving material.

The pressure-sensitive adhesive force control layer 13 is preferably very thin and preferably has a thickness equal to or smaller than 2 micrometers. The pressure-sensitive adhesive force control layer 13 preferably has a tensile strength in a range of 1 to 100 $Kg/cm^2$, for the same reason as given for the surface treating agent layer 12. The pressure-sensitive adhesive force control layer 13 preferably has a melting point or softening point of 100° C. or more or has a melt viscosity at 100° C. of 1000 poises or more, still for the same reason as given for the surface treating agent layer 12.

The pressure-sensitive adhesive force control layer 13 includes a base material and an adhesive force controlling material added thereto, with the addition amount of the controlling material relative to the base material being adjusted to control the adhesion force of the layer 13. More specifically to say, when the pressure-sensitive adhesive force control layer 13 is prepared to be produced, the addition amount of the adhesive controlling material is adjusted relative to the amount of the base material so that both static friction coefficient and water-contact angle of the produced layer 13 may be finely controlled. The layer 13 with its static friction coefficient and water-contact angle being thus finely controlled will impart a desired value of adhesive force (bonding force or sticking force) with respect to the ink image 14 and the surface of the image-receiving material A at the time when the layer 13 with the image 14 formed thereon is attached to be pressed toward the image-receiving material A. (The adhesive force (bonding force or sticking force) imparted by the layer 13 when the layer is pressed is referred to as "pressure-sensitive adhesive force (bonding force or sticky force)", in this description.) Accordingly, the layer 13 will exhibit a finely controlled pressure-sensitive adhesive force.

In the embodiment, the addition amount of the adhesive force controlling material to the layer 13 should be adjusted so that the static friction coefficient of the layer 13 may have a value equal to or more than 0.25, preferably a value equal to or more than 0.30. The layer 13 having such a value of static friction coefficient will allow the image-transferring material 1 to be fixed with respect to the image-receiving material A during when the pressure-sensitive retransfer process is conducted, to thereby achieve complete retransfer operation.

The addition amount of the adhesive force controlling material should be further adjusted so that the water-contact angle of the layer 13 may have a value of in a range of 80° to 120° and preferably in a range of 80° to 110°. The layer 13 having such a value of water-contact angle will allow the adhesive force thereof with respect to the ink image 14 to be large but the adhesive force thereof with respect to the image-receiving material A to be small. In other words, the layer 13 will allow the surface treating agent layer 12 to be fixedly adhered to the ink image 14 but to be not so fixedly adhered to the surface of the image-receiving material A. Accordingly, the parts 12*a* and 13*a* of the layers 12 and 13 underlying the ink image 14 will be retransferred onto the image-receiving material A together with the ink image 14, but other parts 12*b* and 13*b* of the layers 12 and 13 cannot be retransferred onto the image-receiving material. Therefore, it becomes possible to prevent the undesired part 12*b* of the surface treating agent layer 12 which is not positioned below the ink image 14 from being retransferred onto the image-receiving material A.

As apparent from the above, the layer 13 having thus controlled values of static friction coefficient and water-contact angle will impart a desired controlled pressure-sensitive adhesive force between the surface treating agent layer 12 and the ink image 14 and between the surface treating agent layer 12 and the image-receiving material A.

Preferably, the amount of the adhesive force controlling material added to the layer 13 should be selected in a range of 0.01 to 50 parts by weight per 100 parts by weight of the amount of the layer 13, in order to adjust the static friction coefficient of the layer 13 to be equal to or more than 0.25 (preferably equal to or more than 0.30) and the water-contact angle to be in a range of 80° to 120° (preferably in a range of 80° to 110°).

Examples of the base material of the layer 13 preferably include resins (such as polyethylene, ethylene-vinyl acetate copolymer, vinyl chloride-vinyl acetate copolymer, polyvinyl butyral, celluloses, ethylene-ethyl acrylate copolymer, ethylene-acrylic acid copolymer, ionomers, ethylene-methacrylic acid copolymer, polyvinyl alcohol, polyvinyl pyrrolidone, and the like) and waxes (such as polyethylene wax, montan wax, Fischer-Tropsch wax, synthetic wax and the like). They may be used independently or as a mixture of two or more. The use of wax makes it possible to finely control a tensile strength of the layer 13 and expand a range of choice of materials for the layer 13, to thereby improve the retransferring property of the image-retransfer sheet. The layer 13 may further contain a colorant such as pigments and dyes. The layer 13 containing the colorant will provide the same effect as if the ink layer 14 formed thereon became thick. In other words, even if the ink image 14 per se has a low hiding power, the layers 12 and 13 retransferred together with the ink image 14 onto the image-receiving material cooperate with one another to exhibit an increase hiding power to make the image 14 more legible.

Examples of the adhesive force controlling material of the layer 13 preferably include silicone compounds, fluorine-containing compounds, or the like. They may be used independently or as a mixture of two or more.

Though the examples of the base material and the adhesive force controlling material of the layer 13 are listed as above, the base material and the adhesive force controlling material may not be limited to the above-listed materials. In other words, the kinds of the base material can be freely selected, and the kinds of the adhesive force controlling material added to the base material can also be freely selected in accordance with the selected kind of the base material.

The image-retransfer sheet 10 provided with the above-described surface treating agent layer 12 and the pressure-sensitive adhesive force control layer 13 can attain an improved heat-sensitive transferring property and an improved pressure-sensitive retransferring property. The image-retransfer sheet 10 can attain an improved image-rubbing resistance during when it is being handled for the retransfer operation. The sheet 10 can achieve good fixability during the pressure-sensitive retransfer operation. The sheet can allow an operator to easily confirm whether or not the retransfer operation is completed. Furthermore, rubbing resistance of an image retransferred on the image-receiving material can also be improved.

Any ink ribbon conventionally used in a heat-sensitive image-transferring device such as a printer, a typewriter, a word processor, etc. may be used for thermally forming or transferring an image on the image-retransfer sheet 10 of the present invention to thereby produce the image-transferring material 1. Ink ribbons may be those having a coating of ink mainly composed of wax and preferably those having both an ink layer and an image-transferring property control layer. The control layer is provided on the ink layer as a top coating and has high heat-sensitive adhesion, hardness, viscosity and cohesion, as compared to the ink layer, whereby the heat-sensitive transferring property of the ink ribbon is enhanced particularly with respect to an image-retransfer sheet having poor wettability. In this case, both the ink layer and the control layer of the ink ribbon are thermally transferred onto an image-retransfer sheet for forming the ink image. Both the ink layer and the control layer thus transferred onto the image-retransfer sheet can be further retransferred onto an image-receiving material through the pressure-sensitive image retransfer operation. In the case where pressure-sensitive adhesive property is imparted to the ink layer, pressure-sensitive image-retransferring property can further be improved.

The present embodiment is further explained in detail with reference to the following Examples 1 and 2 and Comparative Examples 1 and 2, but the present embodiment should not be construed as being limited thereto.

EXAMPLE 1

The following composition of a surface treating agent was coated on a polyethylene terephthalate film substrate 11 having a thickness of 50 micrometers and dried, to form a surface treating agent layer 12 having a smooth surface and having a water-contact angle of 38° and a coefficient of static friction of about 0.40. The surface treating agent had a melt viscosity at 150° C. of approximately in a range of 2000 to 4000 poises and the layer thereof had a tensile strength of about 20 Kg/cm$^2$.

On thus obtained surface treating agent layer 12, the following composition of a pressure-sensitive adhesive force control layer was coated and dried, to form a pressure-sensitive adhesive force control layer 13 having a water-contact angle in a range of 108° to 110° and having a coefficient of static friction of about 0.36. Accordingly, an image-retransfer sheet 10 was obtained.

| | parts by weight |
|---|---|
| Composition of Surface Treating Agent: | |
| Polyethylene ("Chemipearl M-200", produced by Mitsui Petrochemical Industries Ltd.) | 70 |
| Titanium oxide ("Taipake A-100", produced by ISHIHARA SANGYO KAISHA) | 30 |
| Composition of Pressure-sensitive Adhesive Force Control Layer: | |
| Silicone resin ("KS-841", produced by Shin Etsu Chemical Co., Ltd.) | 1 |
| Hardening agent ("PL-8", produced by Shin Etsu Chemical Co., Ltd.) | 0.04 |
| Ethylene-vinyl acetate copolymer ("EVA FLEX640", produced by Mitsui Du Pont Polychemical Co., Ltd.) | 100 |
| Toluene | 900 |

Then, a white ink was thermally transferred onto the thus prepared image-retransfer sheet 10 with using a heat-sensitive transferring type word processor ("P-touch", produced by Brother Kogyo Kabushiki Kaisha), whereby a dry-processing type image-transferring material 1 having a white ink image 14 of high quality was obtained with less thermal energy than that for a conventional image-retransfer sheet. The dry-processing type image-transferring material 1 was then subjected to a pressure-sensitive retransfer process. In other words, the image-transferring material 1 was placed to be pressed toward a surface of an image-receiving material of paper and plastic articles in such a state that the ink image 14 on the image-transferring material 1 was contacted with the surface of the image-receiving material. During when the image-transferring material 1 was thus being pressed toward the image-receiving material, the image-transferring material 1 was not moved but fixed with respect to the image-receiving material, so that it was easy to retransfer the image 14 onto the image-receiving material. As a result, the white image 14 was accurately retransferred onto the image-receiving material. Any undesired part of the surface treating agent layer 12 of the image-transferring material 1 which was not positioned below the ink image 14 was not retransferred onto the image-receiving material, so that the retransferred white image was very clear. The retransferred image had high hiding power.

Furthermore, since the part 12*a* of the surface treating agent layer 12 underlying the ink image was retransferred onto the image-receiving material together with the ink image, it was easy to confirm whether or not the ink image was retransferred onto the image-receiving material. Since the ink image retransferred on the image-receiving material was coated with the surface treating agent 12*a*, the retransferred image had a good rubbing-resistant property.

EXAMPLE 2

The following composition of a surface treating agent was coated on a nylon film substrate 11 having a thickness of 100 micrometers and dried, to form a surface treating agent layer 12 having a smooth surface and having a water-contact angle of 76° and a coefficient of static friction of about 0.77. The surface treating agent had a melt viscosity at 150° C. of about 5000 poises and the layer thereof had a tensile strength of about 15 $Kg/cm^2$.

On thus obtained surface treating agent layer 12, the following composition of a pressure-sensitive adhesive force control layer was coated and dried, to form a pressure-sensitive adhesive force control layer 13 having a water-contact angle in a range of 105° to 108° and having a static friction coefficient of about 0.36. Accordingly, a image-retransfer sheet 10 was obtained.

| | parts by weight |
|---|---|
| Composition of Surface Treating Agent: | |
| Ionomer ("Chemipearl SA-100", produced by Mitsui Petrochemical Industries Ltd.) | 80 |
| Azo type organic pigment ("CROMOPHTAL Yellow 3G", produced by Ciba-Geigy) | 20 |
| Composition of Pressure-sensitive Adhesive Force Control Layer: | |
| Silicone resin ("KS-841"produced by Shin Etsu Chemical Co., Ltd.) | 2 |
| Hardening agent ("PL-8"produced by Shin Etsu Chemical Co., Ltd.) | 0.08 |
| Silicone oil ("KP-358", produced by Shin Etsu Chemical Co., Ltd.) | 1 |

-continued

| | parts by weight |
|---|---|
| Ethylene-vinyl acetate copolymer ("EVA FLEX640" produced by Mitsui Du Pont Polychemical Co., Ltd.) | 100 |
| Toluene | 900 |

From the thus prepared image-retransfer sheet 10, a dry-processing type image-transferring material 1 was prepared in the same manner as in the Example 1, except that yellow ink was used. Then, the image-transferring material 1 was subjected to the pressure-sensitive retransfer process, as in the Example 1. As a result, the image 14 on the image-transferring material 1 was accurately retransferred onto the image-receiving material without any undesired part of the surface treating agent layer 12 being retransferred thereon. The retransferred image had sufficient hiding power. Accordingly, a retransferred image having a good quality was obtained on the image-receiving material.

COMPARATIVE EXAMPLES 1 and 2

Image-retransfer sheets were prepared in the same manner as in the Examples 1 and 2, except that the pressure-sensitive adhesive force control layers 13 were not formed thereon. The image-retransfer sheets were then subjected to the heat-sensitive transfer as in the Examples to obtain image-transferring materials. The image-transferring materials were subjected to the pressure-sensitive retransfer process as in the Examples. When the images were retransferred onto the image-receiving materials from the image-transferring materials, undesired parts of the surface treating agent layers 12 were retransferred onto the image-receiving materials, so that the retransferred line image became thick.

An image-retransfer sheet of a second preferred embodiment of the present invention will be described below, with reference to FIGS. 3 and 4.

Figure 3:
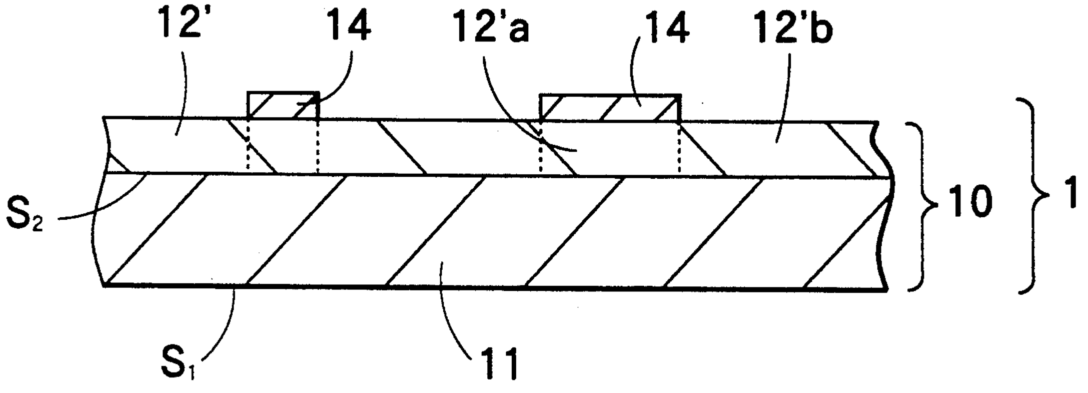
FIG. 3 illustrates a sectional view of an image-retransfer sheet of the second embodiment of the present invention.

As shown in FIG. 3, the image-retransfer sheet 10 of the present embodiment includes a substrate 11 having opposite surfaces S1 and S2 and a surface treating layer 12' formed on one surface S2 of the substrate 11.

The image-retransfer sheet 10 having the above-described structure is adapted to be subjected to a heat-sensitive transfer process with a heat-sensitive transfer device such as a printer, typewriter, word processor, etc., as a result of which a dry processing type image-transferring material 1 is produced. Therefore, the image-transferring material 1 includes the substrate 11 and the surface treating layer 12', on a surface of which an ink image 14 has been thermally printed.

Figure 4:
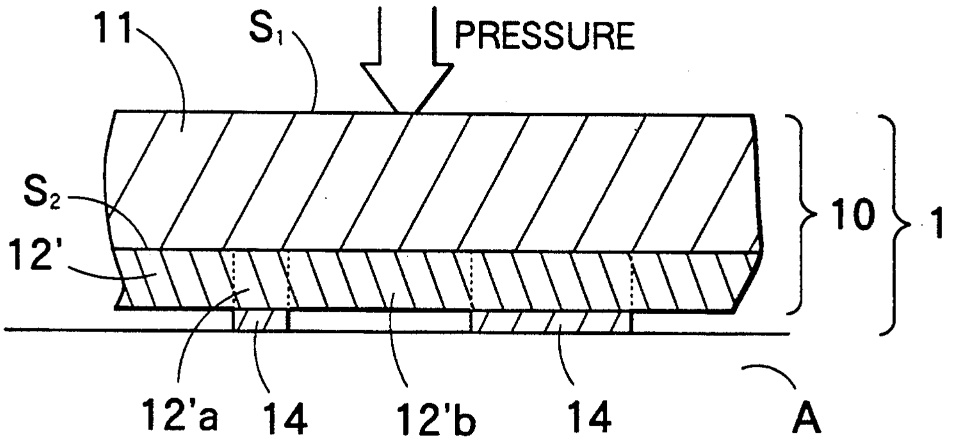
FIG. 4 illustrates the manner how the image-transferring material produced from the image-retransfer sheet is subjected to the pressure-sensitive image retransfer operation.

Thus produced image-transferring material 1 is adapted to be subjected to a pressure-sensitive retransfer process, as shown in FIG. 4. In other words, the image-transferring material 1 is placed on a desired image-receiving material A such that the surface treating layer 12' with the ink image 14 formed thereon is brought into contact with a surface of the image-receiving material A. In such a state, a pressure is applied onto the surface S1 of the substrate 11 of the image-transferring material 1 in a direction indicated by an arrow in FIG. 4 so that the image-transferring material 1 be pressed toward the image-receiving material A. As a result, the ink image 14 and the part 12'*a* of the surface treating layer 12' positioned below the ink image 14 are retransferred onto the surface of the image-receiving material A. However, other parts 12'*b* of the surface treating layer 12' which are not positioned below the ink image 14 are prevented from being retransferred to the image receiving material A.

The substrate 11 which can be used in the image-retransfer sheet of the present embodiment is the same as that used in the first embodiment.

The surface treating layer 12' of the present embodiment will be described in detail, hereinafter. The surface treating layer 12' is formed of surface treating material containing surface treating agent and adhesive force controlling agent added thereto.

The surface treating layer 12' preferably has a thickness in a range of 0.1 to 5 micrometers.

The surface treating layer 12' of the present embodiment preferably has a tensile strength in a range of 1 to 100 $Kg/cm^2$ so that the surface treating material 12' can be retransferred together with an ink image 14 formed on the surface treating material 12' onto the image-receiving material. More specifically to say, if the tensile strength exceeds 100 $Kg/cm^2$, the resulting surface treating layer 12' exhibits too high cohesive force to be retransferred. If it is less than 1 $Kg/cm^2$, the layer strength is so small that the resulting layer is apt to be peeled off when the sheet is simply bent. The surface treating material 12' preferably has a melting point or softening point of 100° C. or more or has a melt viscosity at 100° C. of 1000 poises or more. If surface treating material having a melting point of less than 100° C. is used as the surface treating layer 12', the layer 12' will be melted at the time when the image-retransfer sheet 10 is subjected to the heat-sensitive image transfer process so that the adhesion force between the substrate 11 and the layer 12' will increase, causing failure in retransfer of the image 14.

Since the surface treating layer 12' has the tensile strength and melting point or softening point within the ranges as described above, an ink image 14 formed on the layer 12' through the heat-sensitive image transfer process can be retransferred together with the surface treating material 12', as a result of which there is no particular limit on wettability of the surface treating layer 12'. Accordingly, an ink image 14 of good image property can be formed on the surface treating layer 12' through the heat-sensitive image transfer process with a low thermal energy. Furthermore, the adhesive force of the surface treating layer 12' with respect to the ink image 14 can be made large, so that the ink image 14 formed on the image-transferring material 1 has a high rubbing-resistant property. Furthermore, the static friction coefficient of the surface treating layer can be increased. Specifically, the static friction coefficient of the surface treating layer can be made equal to or larger than 0.25. Therefore, it is possible to prevent the image-retransfer sheet from being moved with respect to the image-receiving material during when the pressure-sensitive retransfer operation is achieved, as a result of which a retransferred image having good image quality can be formed on the image-receiving material with ease.

Hitherto, a large image has been produced using a heat-sensitive image transferring device having a small-serial thermal head by repeating heat-sensitive image transfer of the large image line-by-line. Thus, a large image is formed by piecemeal. However, since each run of transfer has to be overlapped in parts of processed areas with a previous run, a previously transferred portion is often rubbed and removed upon the subsequent run. In order to avoid the undesired removal of the portions, conventionally, heat-sensitive transfer is performed line-by-line to form on an image-retransfer sheet a large image divided into lines with leaving space between lines. In pressure-sensitive retransfer, such a divided large image is retransferred line-by-line on an image-receiving material in such a manner that the lines are united with one after another. According to the present invention, however, such a conventional complicated process can be omitted. Since the image-retransfer sheet of the present invention has relatively high adhesive force with respect to the image, a previously transferred portion is not removed by a subsequent run of heat-sensitive transfer and a large image can be formed on the sheet without leaving space between lines.

As described already, the surface treating layer 12' of the present embodiment is formed of surface treating material which includes not only surface treating agent but also adhesive force controlling agent of polyethylene fine powders added thereto. The added polyethylene fine powders serve to adjust the pressure-sensitive adhesive force (bonding force or sticking force) of the layer 12' to such a value that only the part **12'*a* of the layer 12' positioned below the ink image 14 may be retransferred onto the image-receiving material A together with the ink image but another part 12'*b*** not positioned below the ink image may not be retransferred.

When the surface treating layer 12' is prepared, the addition amount of the polyethylene fine powders is adjusted relative to the amount of the surface adhesive agent so that adhesive force of the produced surface treating layer 12' may be properly controlled. In other words, a proper amount of polyethylene fine powders are added to the surface treating agent of the layer 12' to thereby control or decrease the pressure-sensitive adhesive force of the layer 12' to such a value that the part **12'*a* underlying the image 14 may be retransferred onto the image-receiving material but the part 12'*b* may not be retransferred thereto. Accordingly, the layer 12' added with the proper amount of polyethylene fine powders will impart a desired value of adhesive force (bonding force or sticking force) with respect to the ink image 14 and the surface of the image-receiving material A at the time when the layer 12' with the image 14 formed thereon is attached to be pressed toward the image-receiving material A. (The adhesive force (bonding force or sticking force) imparted by the layer 12'** when the layer is pressed is referred to as "pressure-sensitive adhesive force", in this description.)

More specifically to say, the layer 12' added with the proper amount of the polyethylene fine powders will allow the pressure-sensitive adhesive force thereof with respect to the ink image 14 to be large but the pressure-sensitive adhesive force thereof with respect to the image-receiving material A to be small. In other words, the layer 12' will be fixedly adhered to the ink image 14 but will not be so fixedly adhered to the surface of the image-receiving material A. Accordingly, the part **12'*a* of the layer 12' underlying the ink image 14 will be retransferred onto the image-receiving material A together with the ink image 14, but another part 12'*b* of the layer 12' cannot be retransferred onto the image-receiving material. Therefore, it becomes possible to prevent the undesired part 12'*b* of the surface treating layer 12' which is not positioned below the ink image 14** from being retransferred onto the image-receiving material A.

The amount of the polyethylene fine powders added to the layer 12' is preferably in a range of 0.01 to 50 parts by weight per 100 parts by weight of the amount of the layer 12', in order to control the layer 12' to have such a value of the pressure-sensitive adhesive force that the part **12'*a* of the layer 12' underlying the ink image 14 will be retransferred onto the image-receiving material together with the ink image 14 but another part 12'*b* of the layer 12'** cannot be retransferred onto the image-receiving material.

Accordingly, the polyethylene fine powders added in the layer 12' serve to adjust water-contact angle and static friction coefficient of the layer 12' to thereby control the pressure-sensitive adhesive force thereof into the proper value. In addition, the polyethylene fine powders added in the layer 12' serve to adjust cohesive force of the layer 12' and adhesive force of the layer 12' relative to the PET sheet.

Since the composition of the surface treating layer 12' contains the polyethylene fine powders as described above, the compositions of the layer 12' can be dried at low temperature (not higher than 100° C.) for a short period of time (not more than 30 seconds). Accordingly, the use of the polyethylene fine powders can reduce production cost and production period of time for the image-retransfer sheet.

Furthermore, the composition containing the polyethylene fine powders does not form a rigid thin film on a surface of tools used for preparation and coating of the composition, and the tools can easily be cleaned and used for other purposes without problems such as repelling, etc. The resulting coated layer using the polyethylene fine powders is easily dried and is free from offset onto the back surface of the sheet when piled. The polyethylene fine powders can be easily dispersed in the coating composition regardless of their solubility in solvents and compatibility with other components (surface treating agent) of the surface treating layer 12', and thus the use of the polyethylene fine powders is very advantageous in selection of materials for the surface treating layer 12' and production of the image-retransfer sheet 10.

Examples of the surface treating agent for the surface treating layer 12' of the present embodiment include resins (such as polyethylene, ethylene-vinyl acetate copolymer, vinyl chloride-vinyl acetate copolymer, polyvinyl butyral, celluloses, ethylene-ethyl acrylate copolymer, ethyleneacrylic acid copolymer, ionomers, ethylene-methacrylic acid copolymer, polyvinyl alcohol, polyvinyl pyrrolidone, and the like) and waxes (such as polyethylene wax, montan wax, Fischer-Tropsch wax, synthetic wax and the like). They may be used independently or as a mixture of two or more. The use of wax makes it possible to finely control the tensile strength of the surface treating layer 12' and expand a range of choice of materials for the surface treating agents, to thereby improve the retransferring property of the image-retransfer sheet.

The surface treating agent may further contain a colorant such as pigments and dyes. The layer 12' containing the colorant will provide the same effect as if an ink layer 14 formed thereon became thick. In other words, even if the ink image 14 per se has a low hiding power, the surface treating layer 12' retransferred together with the ink image 14 onto the image-receiving material cooperate with each other to exhibit an increase hiding power to make the image 14 more legible.

In the case where the surface treating agent mainly includes the aforesaid resins, the surface treating agent is preferably coated on the substrate 11 in the form of dispersion such as emulsions and suspension. This is because if it is dissolved in a solvent or melted before being coated on the substrate in the form of solution or hot melt, the tensile strength of the surface treating layer 12' will be unwillingly extremely increased. In order to control the tensile strength or the adhesion of the surface treating layer 12', a filler may be added to the layer.

With using the above-described surface treating layer 12' of the embodiment, it becomes possible to retransfer not only the ink image 14 but also the underlying part **12'*a* of the surface treating layer 12' onto the image-receiving material A. Accordingly, the ink image 14 can be completely retransferred onto the image-receiving material A without any residual ink remaining on the image-transferring material 1. It becomes easy to confirm completion of retransfer. Furthermore, the part 12'*a* of the surface treating layer 12' retransferred together with the ink image 14 will serve as a protective layer for the ink image 14** on the image-receiving material, and therefore the image retransferred onto the image-receiving material has a high rubbing resistant property.

Accordingly, the image-retransfer sheet 10 provided with the above-described surface treating layer 12' can attain an improved heat-sensitive image transferring property and an improved pressure-sensitive image retransferring property. The image-retransfer sheet 10 can attain an improved image-rubbing resistance during when it is being handled for the retransfer operation. The sheet 10 can achieve good fixability during the pressure-sensitive image retransfer operation. The sheet can allow an operator to easily confirm whether or not the image retransfer operation is completed. Furthermore, rubbing resistance of an image retransferred onto the image-receiving material can also be improved.

The present embodiment is further explained in detail with reference to the following Example 3 and Comparative Example 3, but the present embodiment should not be construed as being limited thereto.

EXAMPLE 3

The following composition of a surface treating material was coated on a polyethylene terephthalate film substrate 11 having a thickness of 50 micrometers and dried, to form a surface treating layer 12' having a smooth surface and having a water-contact angle of 39° and a coefficient of static friction of about 0.42. The surface treating material had a melt viscosity at 150° C. of approximately in a range of 2000 to 4000 poises and the layer thereof had a tensile strength of about 20 $Kg/cm^2$. Accordingly, an image-retransfer sheet 10 of the present embodiment was obtained.

| Composition of Surface Treating Material: | parts by weight |
|---|---|
| Polyethylene ("Chemipearl M-200", produced by Mitsui Petrochemical Industries Ltd.) | 80 |
| Titanium oxide ("Taipake A-100", produced by ISHIHARA SANGYO KAISHA) | 20 |
| Polyethylene fine powders ("FRO-BEADS LE-1080", produced by Iron Manufacturing Chemical Industries, Ltd.) | 0.01 |

Then, a white ink was thermally transferred onto the thus prepared image-retransfer sheet 10 with using a heat-sensitive transferring type word processor ("P-touch", produced by Brother Kogyo Kabushiki Kaisha), whereby a dry-processing type image-transferring material 1 having an ink image 14 of high quality was obtained with less thermal energy than that for a conventional image-retransfer sheet. The dry-processing type image-transferring material 1 was then subjected to a pressure-sensitive image retransfer process. In other words, the image-transferring material 1 was placed to be pressed toward a surface of an image-receiving material of paper and plastic articles in such a state that the ink image 14 on the image-transferring material 1 was contacted with the surface of the image-receiving material. During when the image-transferring material 1 was thus being pressed toward the image-receiving material, the image-transferring material 1 was not moved but fixed with respect to the image-receiving material, so that it was easy to retransfer the image 14 onto the image-receiving material. As a result, the image 14 was accurately retransferred onto the image-receiving material. Any undesired part of the surface treating layer 12' of the image-transferring material 1 which was not positioned below the ink image 14 was not retransferred onto the image-receiving material, so that the retransferred image was very clear. The retransferred image had high hiding power.

Furthermore, since the part 12'*a* of the surface treating layer 12' underlying the ink image 14 was retransferred onto the image-receiving material together with the ink image, it was easy to confirm whether or not the ink image was retransferred onto the image-receiving material. Since the ink image retransferred on the image-receiving material was coated with the surface treating material 12'*a*, the retransferred image had a good rubbing-resistant property.

COMPARATIVE EXAMPLE 3

An image-retransfer sheet was prepared in the same manner as in the Example 3, except that the polyethylene fine powders were not added to the surface treating layer. The image-retransfer sheet was subjected to the heat-sensitive image transfer as in the Example 3 to obtain the image-transferring material. The image-transferring material was subjected to the pressure-sensitive retransfer process as in the Example. When the image was retransferred onto the image-receiving material, undesired parts of the surface treating agent layer were retransferred onto the image-receiving material, so that the retransferred line image was thick. It was hardly possible to recognize thin part of the original image.

While the present invention has been described in detail and with reference to specific embodiments thereof, it will be apparent to one skilled in the art that various changes and modifications can be made therein without departing from the spirit and scope thereof.

What is claimed is:

1. An image-retransfer sheet for receiving an image and for retransferring the received image onto a desired image-receiving medium, comprising:

- a substrate having a thickness in a range of 25 to 200 micrometers; and
- a surface layer coated on one surface of said substrate for defining an image-transferring surface onto which an image is to be transferred and from which the transferred image is to be retransferred onto a desired image-receiving medium, said surface layer having a thickness in the range of 0.1 to 5 micrometers and a tensile strength in a range of 1 to 100 $Kg/cm^2$, said surface layer comprising a surface treating agent mixed with an adhesive force control material including polyethylene fine powders, an amount of the adhesive force control material mixed with the surface treating agent being in the range of 0.01 to 50 parts by weight per 100 parts by weight of the surface treating agent to control an adhesive force to be imparted from the image-receiving surface such that a portion of said surface layer corresponding to an area of the image-transferring surface on which the image is transferred may be transferred together with the image onto the desired image-receiving medium.

2. An image-retransfer sheet as claimed in claim 1, wherein the adhesive force control material mixed with the surface treating agent includes the polyethylene fine powders mixed with the surface treating agent, an amount of the polyethylene fine powders mixed with the surface treating agent being in the range of 0.01 to 50 parts by weight per 100 parts by weight of the surface treating agent to control the adhesive force to be imparted from the image transferring surface to have such a value that a portion of said surface layer corresponding to an area on which the image is transferred may be transferred together with the image onto the desired image-receiving medium.

3. An image-retransfer sheet as claimed in claim 1, wherein said surface layer has at least one of melting point and softening point of said surface layer is no less than 100°° C.

4. An image-retransfer sheet as claimed in claim 1, wherein said surface layer has a melt viscosity at 100° C. no less than 1000 poises.

5. An image-retransfer sheet as claimed in claim 1, wherein said surface layer is formed from a dispersion of the surface treating agent mixed with the adhesive force control material.

6. An image-retransfer sheet as claimed in claim 1, wherein said surface layer defines the image-transferring surface onto which an imaging material is to be transferred and from which the transferred imaging material is to be retransferred onto the desired image-receiving medium, the imaging material forming the image, and wherein the adhesive force control material mixed with the surface treating agent controls the adhesive force to have such a value that a portion of said surface layer corresponding to an area of the image-transferring surface on which the imaging material is transferred may be transferred together with the imaging material onto the desired image-receiving medium.

7. An image-retransfer sheet as claimed in claim 6, wherein the imaging material includes an ink material.

8. An image-retransfer sheet for receiving an image and for retransferring the received image onto a desired image-receiving medium, comprising:

- a substrate having a thickness in the range of 25 to 200 micrometers;
- a surface treating layer comprising a surface treating agent and coated on one surface of said substrate, said surface treating layer having a thickness in the range of 0.1 to 5 micrometers and a tensile strength in a range of 1 to 100 $Kg/cm^2$; and
- an adhesive force control layer coated on said surface treating layer for receiving an imaging material to be attached thereon and for retransferring the imaging material therefrom onto a desired image-receiving medium, the imaging material forming an image, said adhesive force control layer having a thickness of no more than 2 micrometers and comprising a first material mixed with an adhesive force controlling material, an amount of the adhesive force controlling material mixed with the first material being in the range of 0.01 to 50 parts by weight per 100 parts by weight of the first material to control an adhesive force of said adhesive force control layer to allow a portion of said surface treating layer corresponding to a portion of said adhesive force control layer on which the imaging material is attached to be transferred onto the imagereceiving medium together with the imaging material.

9. An image-retransfer sheet as claimed in claim 8, wherein at least one of melting point and softening point of said surface treating layer is no less than 100° C.

10. An image-retransfer sheet as claimed in claim 8, wherein said surface treating layer has a melt viscosity at 100° C. no less than 1000 poises.

11. An image-retransfer sheet as claimed in claim 8, wherein said surface treating layer is formed from a dispersion of the surface treating agent.

12. An image-retransfer sheet as claimed in claim 8, wherein said adhesive force control layer has a static friction coefficient no less than 0.25.

13. An image-retransfer sheet as claimed in claim 8, wherein said adhesive force control layer has a water-contact angle in a range of 80° to 120°.

14. An image-retransfer sheet as claimed in claim 8, wherein the imaging material includes an ink material.

15. An image-retransfer sheet for receiving an image and for retransferring the received image onto a desired image-receiving medium, comprising:

a substrate having a thickness in a range of 25 to 200 micrometers; and a surface treating layer coated on one surface of said substrate for receiving an imaging material and for retransferring the imaging material therefrom onto a desired image-receiving medium, the imaging material forming an image, said surface treating layer having a thickness in the range of 0.1 to 5 micrometers, a tensile strength in a range of 1 to 100 $Kg/cm^2$ and comprising a surface treating agent mixed with polyethylene fine powders, an amount of the polyethylene fine powders mixed with the surface treating agent being in the range of 0.01 to 50 parts by weight per 100 parts by weight of the surface treating agent to control an adhesive force of said surface treating layer to have such a value that a portion of said surface treating layer on which the imaging material is attached may be retransferred onto the desired image-receiving medium together with the imaging material.

16. An image-retransfer sheet as claimed in claim 15, wherein at least one of melting point and softening point of said surface treating layer is no less than 100° C.

17. An image-retransfer sheet as claimed in claim 15, wherein said surface treating layer has a melt viscosity at 100° C. no less than 1000 poises.

18. An image-retransfer sheet as claimed in claim 15, wherein said surface treating layer is formed from a dispersion of the surface treating agent mixed with the polyethylene fine powders.

19. An image-retransfer sheet as claimed in claim 15, wherein the imaging material includes an ink material.

* * * * *